July 16, 1935.　　　　H. A. FELDBUSH　　　　2,008,300
SHEAVE
Filed Nov. 27, 1931　　2 Sheets-Sheet 1
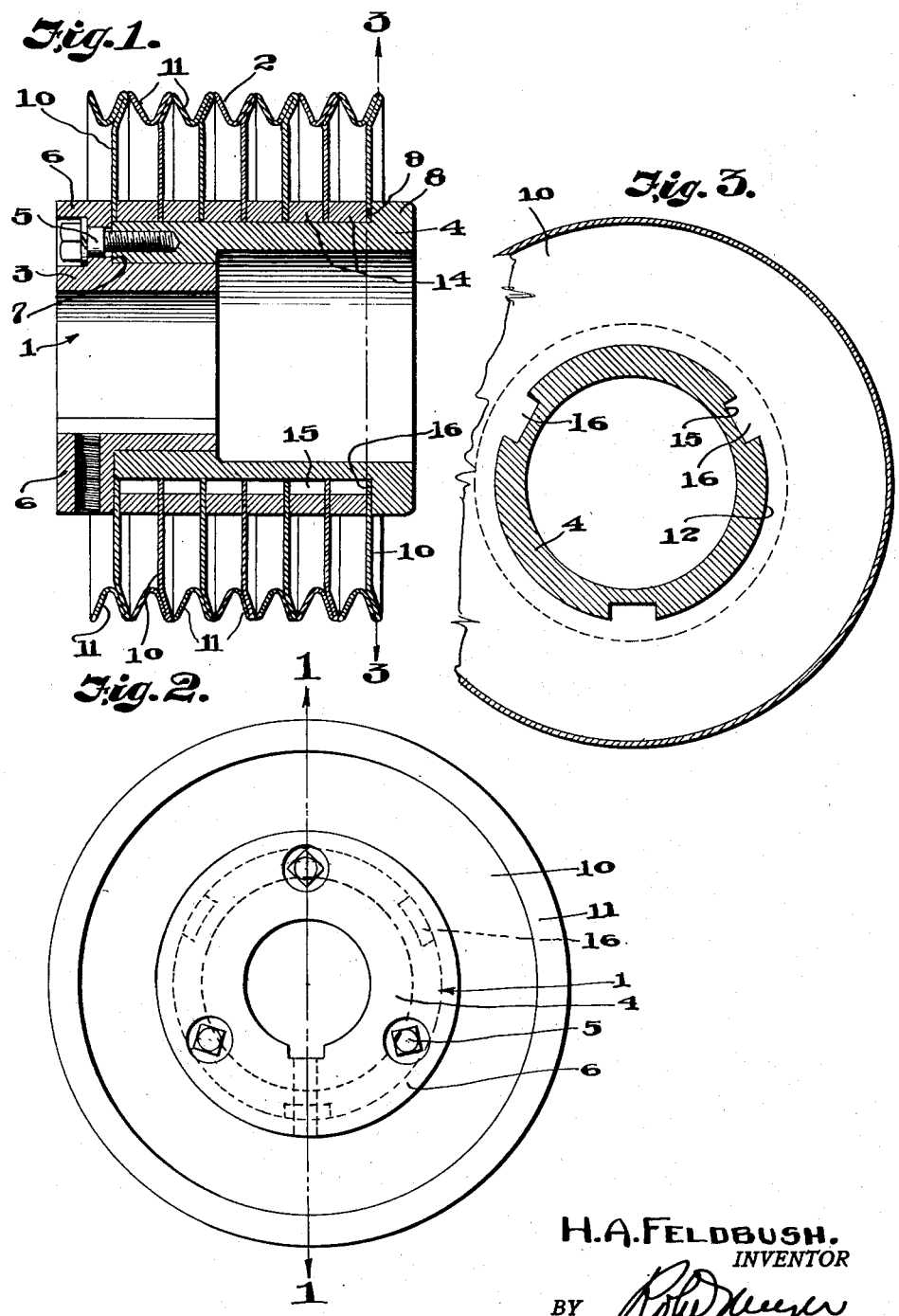
H. A. FELDBUSH.
INVENTOR
BY *[signature]*
ATTORNEY July 16, 1935.  H. A. FELDBUSH  2,008,300
SHEAVE
Filed Nov. 27, 1931  2 Sheets-Sheet 2

H. A. FELDBUSH.
INVENTOR
BY Rob Meyer
ATTORNEY

Patented July 16, 1935

2,008,300

UNITED STATES PATENT OFFICE 2,008,300

SHEAVE

Harry A. Feldbush, Cincinnati, Ohio, assignor to Worthington Pump and Machinery Corporation, New York, N. Y., a corporation of Virginia Application November 27, 1931, Serial No. 577,567

2 Claims. (Cl. 74—230.8)

This invention relates to sheaves for use in power transmitting drives and particularly drives embodying a plurality of substantially V belts.

An object of the invention is to provide a sheave which is simple in construction, comparatively cheap to manufacture, and so constructed that sheaves having any desired number of peripheral grooves may be assembled from stock, thereby materially reducing inventory and permitting prompt shipment of sheaves desired.

With these and other objects in view, as may appear from the accompanying specification, the invention consists of various features of construction and combination of parts, which will be first described in connection with the accompanying drawings, showing a sheave of the preferred form embodying the invention, and the features forming the invention will be specifically pointed out in the claims.

In the drawings:

Fig. 1 is a longitudinal section through the preferred form of the improved sheave, taken on the line 1—1 of Fig. 2.

Fig. 2 is an end view of the sheave.

Fig. 3 is a cross section taken on the line 3—3 of Fig. 1.

Figure 4:
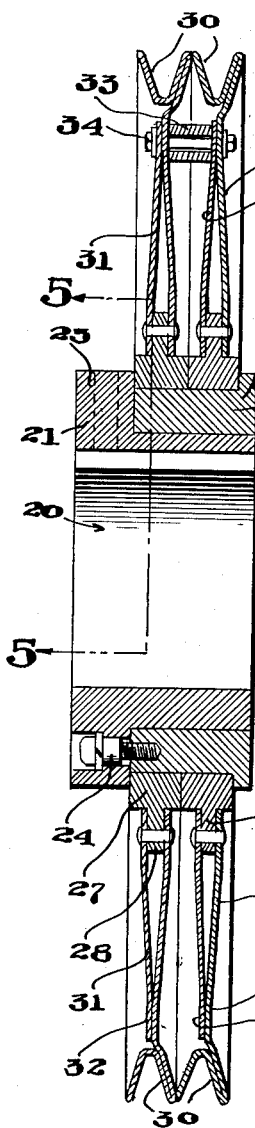
Fig. 4 is a longitudinal section of a modified form of the invention.

Referring more particularly to the drawings, the improved sheave shown in Fig. 1 of the drawings is provided for use in power transmitting drives which employ a plurality of V belts, and it comprises essentially the main elements of hub section 1 and rim section 2. The hub section 1 is composed of a pair of telescoping sections 3 and 4 which are connected by means of suitable cap screws or bolts 5. The cap screws or bolts 5 extend through the annular flange 6 on the section 3 of the hub, and thread into the inner end of the section 4, for drawing this inner end tightly against the shoulder 7 formed by the annular flange 6. As clearly shown in Fig. 1 of the drawings, the diameter of the flange 6 is greater than the maximum diameter of the section 4, and the section 4 has an annular flange 8 on its outer end, the diameter of which is equal to the diameter of the flange 6. The flanges 6 and 8 provide an annular groove about the periphery of the hub section, between the shoulders 7 and 9 formed by the flanges 6 and 8, respectively.

The rim section 2 is made up of a plurality of discs 10 which are preferably spun from sheet metal, as disclosed in the prior U. S. Patent, #1,680,061, of August 7, 1928. The discs 10 have annular V grooves 11 spun at their outer edges, which are provided for receiving the V belts (not shown) used in a power transmission drive. When assembled, the edges of adjacent grooves 11 of the discs 10 engage. The discs 10 are provided with central openings 12 which fit about the hub section 4, and the discs are properly spaced in sheave forming formation and against accidental lateral movement, by spacing rings 14. The disc 10 at one end of the sheave engages against the shoulder 7, while the disc 10 at the opposite end of the sheave engages against the shoulder 9, and these discs are clamped against the respective shoulders, while the intermediate sheaves are clamped against the respective spacing rings 14 by the tightening of the cap screws 5, which maintains the various elements of the sheave in their proper position.

For the purpose of preventing accidental circumferential or rotary creeping movement of the discs 10, the hub section 4 is provided with circumferentially spaced grooves 15, while the discs 10 are provided with tongues 16 correspondingly spaced and which engage in the grooves 15.

It will be appreciated that sheaves of various widths and of the same diameter are used in different drives and also that sheaves of different diameters, utilizing the same size belts are employed in different drives, so that an innumerable number of different sizes and widths of sheaves are necessary to provide a sufficient stock to insure prompt shipment, and with the various types of cast sheaves of approved type, an inventory or stock of enormous quantity is necessary, which is greatly reduced by the present invention, since it will be necessary only to stock a supply of the discs 10 of the various diameters, a supply of hub sections 3 of the different diameters. Then, when a three groove sheave or a five groove sheave or a seven groove sheave is required, all that is necessary is to make a hub section 4 of the proper length, and the sheave of the desired diameter and width may be quickly assembled from the stock of available parts. It is to be understood that the hub sections 3 of any given diameter, for any given diameter of shaft, are uniform for all different sizes of sheaves utilizing such shaft diameter, and the only part of the sheave construction which is special is the hub section 4, it being necessary to make this hub section of the proper length to correspond with the width of pulley desired.

Figure 5:
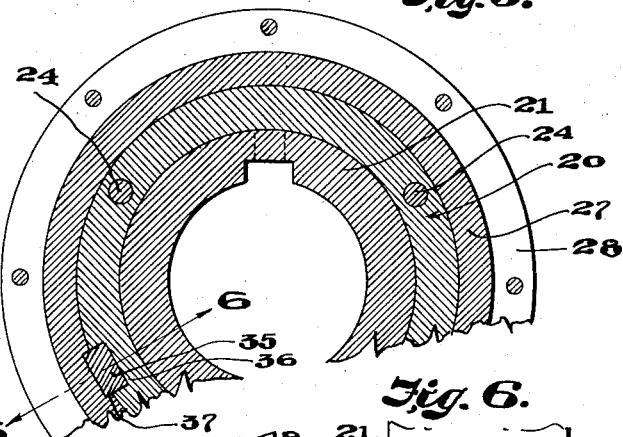
Fig. 5 is a fragmentary cross section taken on the line 5—5 of Fig. 4.
Figure 6:
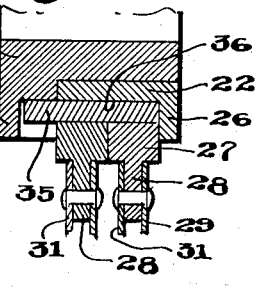
Fig. 6 is a fragmentary longitudinal section taken on the line 6—6 of Fig. 5.

In Figs. 4, 5, and 6 of the drawings, a modified form of the invention is shown, which form is particularly adaptable for sheaves of large diameter. In the modified form shown in Figs. 4 to 6, inclusive, the hub 20 is made up of telescoping hub sections 21 and 22 the same as the hub sections 3 and 4, the size and diameter of these hub sections 21 and 22 being dependent upon the shaft size. The sections 21 and 22 are connected by cap screws 24 in the same manner as the hub sections 3 and 4 are connected, and they have the annular flanges 25 and 26, respectively, formed upon the hub sections, for confining the rim forming sections of the sheave therebetween.

In this modified form of the sheave, the rim forming sections comprise carrying spacing rings 27, which fit about or upon the hub section 22, and have annular flanges 28 centrally disposed upon their peripheries. The sheet metal discs 29 which have the V grooves 30 formed about their peripheries, are mounted about the carrying spacing rings 27, and engage against the annular flanges 28 to which they are riveted or otherwise suitably attached. In instances where the pulley diameters are large, it may be found necessary to provide bracing or sustaining discs, and in Fig. 4 of the drawings such bracing or sustaining discs 31 are shown. The discs 31 engage against the flanges 28 and like the discs 29 are riveted thereto. The discs 31 extend outwardly and are bent or bowed oppositely to the discs 29, having flat portions 32 which engage against corresponding flat portions 33 formed on the discs 29 near the peripheral grooves 30.

It also may be desirable in relatively large sheaves to provide additional bracing for the discs 29 and such additional bracing is shown in the upper half of Fig. 4 of the drawings, it being understood that this additional bracing comprising the collars 33 and bolts 34, may or may not be employed in the sheave structure, depending upon the size of the sheave, the rigidity of the metal of which the discs 29 and 31 are formed, and upon the desires of the manufacturer. As shown in the upper part of Fig. 4 of the drawings, the bolts 34 extend through the flat engaging portions 32 and 33 of the discs 29 and 31, between the pairs of discs which comprise each unit of the rim structure. The collars 33 are loosely mounted upon the bolts 34 and have end engagement with the facing discs of the rim forming sections of the sheave, so as to prevent collapsing of the rim forming sections or movement of the discs of one section toward the discs of the adjacent section, while outward movement of such discs is prevented by the bolts.

For the purpose of preventing circumferential movement or creeping of the rim forming sections of the sheave, a spline 35 is provided which is mounted in a suitable groove 36 formed in the hub sections 21 and 22 and engages in corresponding grooves 37 formed in the spacing carrying rings 27.

Figure 8:
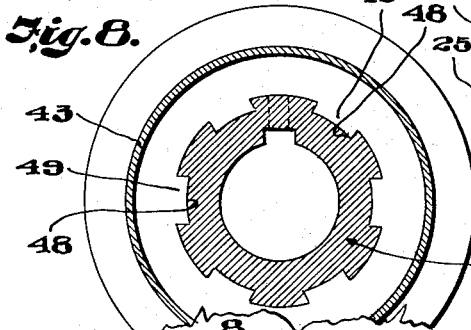
Fig. 8 is a cross section taken on the line 8—8 of Fig. 7.
Figure 7:
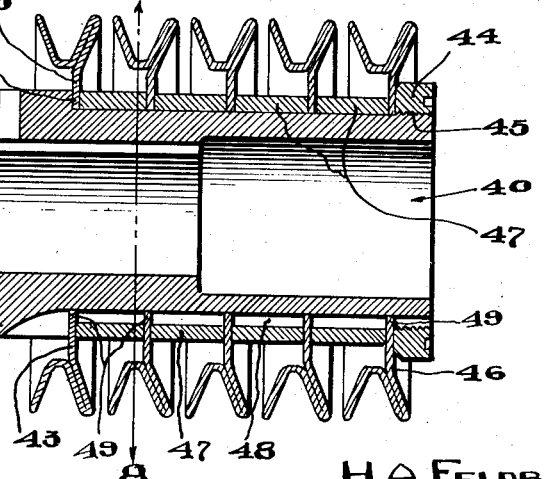
Fig. 7 is a longitudinal section through a still further modified form of the invention.

A still further modified form of the sheave construction is shown in Figs. 7 and 8 of the drawings, and this form is particularly adaptable for sheaves of small diameters, and it embodies the same advantages of assembly as are embodied in the two forms previously described.

In this modified form shown in Figs. 7 and 8 of the drawings, the hub structure 40 of the sheave comprises the hub section 41 which has the shoulder 42 formed thereon, against which the rim forming disc 43 engages, which is the end disc of the sheave structure. The hub section 44 threads upon the hub section 41, as shown at 45, and it cooperates with the rim forming section 46 at the opposite end of the sheave from the rim section 43, and the spacing collars 47 for clamping the various rim forming sections in position. In Fig. 7 of the drawings, it will be noted that the spacing rings 47 are of a width so that when they are positioned between the adjacent rim forming discs, they will space the discs so that the facing edges of adjacent discs will be out of engagement. This is merely a detail and such arrangement may be employed in the modifid form shown in Fig. 7 or in the preferred form shown in Fig. 1, as desired, or the spacing collars 47 may be of such width as to permit engagement of the adjacent discs, without departing from the spirit of the invention.

The hub section 41 is provided with a plurality of circumferentially spaced grooves 48 into which tongues 49 formed on the various sheave forming discs, engage. These tongues and grooves 48 and 49 are provided for preventing circumferential creeping of the various discs upon the hub structure.

From the foregoing description taken in connection with the accompanying drawings, it will be apparent that a sheave structure has been provided which is made up of a plurality of stock units, so that sheaves of various diameters or widths may be quickly assembled, and that, owing to the uniformity of any of the parts, the stock necessary for making many different sizes or widths of pulleys may be relatively small in quantity; and the sheaves, owing to the extreme accuracy of the spun metal grooves, and with accurate machining of the other parts will be accurate, adaptable for use with standard belts, and the cost will be comparatively small.

What is claimed is:—

1. In a sheave, in combination with rim forming discs, a hub composed of telescoping members, spacer carrying rings mounted upon one of said hub members, said rim forming discs attached to said spacer carrying rings, flanges on said hub members for engaging said spacer carrying rings for clamping them in position, means for connecting said telescoping hub sections, and bracing discs attached to said spacer carrying rings and engaging said rim forming discs adjacent to their peripheries.

2. In a sheave, in combination with rim forming discs, a hub composed of telescoping members, spacer carrying rings mounted upon one of said hub members, said rim forming discs attached to said spacer carrying rings, flanges on said hub members for engaging said spacer carrying rings for clamping them in position, means for connecting said telescoping hub sections, bracing discs attached to said spacer carrying rings and engaging said rim forming discs adjacent to their peripheries, and means engaging said hub sections and said spacer rings for preventing circular displacement of the spacer carrying rings.

HARRY A. FELDBUSH.